(12) United States Patent
Sokka

(10) Patent No.: US 11,752,657 B2
(45) Date of Patent: Sep. 12, 2023

(54) COATED MULTI-PLY WOOD PANEL AND METHOD OF PRODUCING A CORE BOARD

(71) Applicant: Metsäliitto Osuuskunta, Espoo (FI)

(72) Inventor: Kasperi Sokka, Espoo (FI)

(73) Assignee: Metsäliitto Osuuskunta, Espoo (FI)

( * ) Notice: Subject to any disclaimer, the term of this patent is extended or adjusted under 35 U.S.C. 154(b) by 927 days.

(21) Appl. No.: 16/462,969

(22) PCT Filed: Nov. 22, 2017

(86) PCT No.: PCT/FI2017/050810
§ 371 (c)(1),
(2) Date: May 22, 2019

(87) PCT Pub. No.: WO2018/096123
PCT Pub. Date: May 31, 2018

(65) Prior Publication Data
US 2019/0375128 A1 Dec. 12, 2019

(30) Foreign Application Priority Data
Nov. 22, 2016 (FI) ..................................... 20165882

(51) Int. Cl.
*B27D 1/06* (2006.01)
*B27M 3/00* (2006.01)
(Continued)

(52) U.S. Cl.
CPC .............. *B27D 1/06* (2013.01); *B27M 3/0053* (2013.01); *B27N 3/04* (2013.01); *B27N 7/005* (2013.01); *B32B 5/02* (2013.01); *B32B 21/10* (2013.01)

(58) Field of Classification Search
CPC .......... B27D 1/06; B27M 3/0053; B27N 3/04; B27N 7/005; B32B 5/02; B32B 21/10
See application file for complete search history.

(56) References Cited

U.S. PATENT DOCUMENTS

| | | | |
|---|---|---|---|
| 2,412,534 A | 12/1946 | Randall | |
| 3,491,989 A | * 1/1970 | Fritz | B27D 1/02 34/345 |

(Continued)

FOREIGN PATENT DOCUMENTS

| | | |
|---|---|---|
| DE | 202006012116 U1 | 12/2007 |
| EP | 0462586 A2 | 12/1991 |

(Continued)

OTHER PUBLICATIONS

English machine translation of WO2016110414A; Jul. 14, 2016; Pollmeier; 7 pages. (Year: 2016).*

(Continued)

*Primary Examiner* — Linda L Gray
(74) *Attorney, Agent, or Firm* — Laine IP Oy

(57) ABSTRACT

A method of producing a core board suitable for a coated multi-ply wood panel, as well as a coated multi-ply wood panel. The method comprises the steps of providing a wood based material in the form of a plurality of layers and an adhesive suitable for bonding the layers to each other; the layers of the wood based material and the adhesive being arranged in alternating order to form a stack, the stack having two opposite faces formed by a wood based layer. On at least one of the faces of the stack there is further provided adhesive and fibrillated fibers to form a modified stack which is pressed by one-step pressing to form a multi-ply wood panel having a facing coated with a layer of fibrillated fibers. The even and smooth surface of the core panel makes it particular suitable for coating with, e.g., glossy films.

18 Claims, 1 Drawing Sheet

1.5 HDF —/—/— 1.5 HDF

(51) Int. Cl.
  *B32B 5/02*   (2006.01)
  *B32B 21/10*  (2006.01)
  *B27N 3/04*  (2006.01)
  *B27N 7/00*  (2006.01)

(56) References Cited

U.S. PATENT DOCUMENTS

| | | | |
|---|---|---|---|
| 4,364,984 A | 12/1982 | Wentworth | |
| 4,541,880 A | 9/1985 | Arena et al. | |
| 4,829,108 A * | 5/1989 | Okuda | C09D 133/064 524/109 |
| 5,089,348 A | 2/1992 | Louderback | |
| 5,106,697 A * | 4/1992 | Whittemore | C08G 8/10 156/335 |
| 5,425,976 A | 6/1995 | Clarke et al. | |
| 6,350,331 B1 * | 2/2002 | Kon | B27N 3/00 144/350 |
| 6,731,841 B1 | 5/2004 | Shirk et al. | |
| 8,737,777 B2 | 5/2014 | Pitwon | |
| 9,044,907 B2 | 6/2015 | Pitwon | |
| 2002/0155279 A1 | 10/2002 | Dai et al. | |
| 2005/0136276 A1 | 6/2005 | Borup et al. | |
| 2007/0218306 A1 | 9/2007 | Evers et al. | |

FOREIGN PATENT DOCUMENTS

| | | | | |
|---|---|---|---|---|
| EP | 0959177 | A2 | | 11/1999 |
| EP | 1454763 | A2 | | 9/2004 |
| EP | 2272927 | A | | 1/2011 |
| EP | 2957351 | A1 | | 12/2015 |
| EP | 3205496 | A1 | | 8/2017 |
| FI | 79332 | A | | 8/1989 |
| JP | 403254902 | A | | 11/1991 |
| JP | H10193309 | A | * | 7/1998 |
| JP | H1158313 | A | | 3/1999 |
| JP | 2000167805 | A | | 6/2000 |
| JP | 2001322102 | A | * | 11/2001 |
| JP | 2002067016 | A | | 3/2002 |
| JP | 2002137201 | A | | 5/2002 |
| JP | 3909897 | B2 | | 2/2007 |
| JP | 4156048 | B2 | | 7/2008 |
| JP | 2008303679 | A | | 12/2008 |
| JP | 2014083810 | A | | 5/2014 |
| WO | WO2006005136 | A | | 1/2006 |
| WO | WO2011101546 | A1 | | 8/2011 |
| WO | WO2014096558 | A1 | | 6/2014 |
| WO | WO2016110414 | A1 * | 7/2016 | ............... B27G 1/00 |

OTHER PUBLICATIONS

English machine translation for JP2001322102A, Sugiyama, Nov. 20, 2001, 7 pages. (Year: 2001).*
English machine translation for JPH10193309A, Nakamoto, Jul. 28, 1998, 3 pages. (Year: 1998).*
HDO/MDO Plywood Product Guide: APA, 2011, 14 pages.
Kymäläinen et al: The effect of compression and incision on wood veneer and plywood physical and mechanical properties. Wood Material Science & Engineering, 2020, vol. 15, No. 2, pp. 97-103.
LVL Handbook Europe, 2020, 38 pages.
Metsäteollisuus Oy et al: Vanerikäsikirja. 2006, 68 pages.
Varis et al: Puulevyteollisuus. 2017, 19 pages.
Vick: Adhesive Bonding of Wood Materials. Forest Product Laboratory, 1999, 36 pages.
Youngquist: Wood-based Composites and Panel Products. Forest Products Laboratory, 1999, 32 pages.

* cited by examiner 1.5 HDF –/–/– 1.5 HDF

COATED MULTI-PLY WOOD PANEL AND METHOD OF PRODUCING A CORE BOARD

FIELD OF INVENTION

The present invention relates to the production of coated wood panels. In particular, the present invention relates to a method of manufacturing a core board suitable for producing coated multi-ply wood panels. The present invention also concerns a coated wood panel.

BACKGROUND

Furniture, such as cupboards and tables, as well as interior decoration panels are commonly manufactured from particle boards which are given a surface coating in the form of coating layers containing hiding pigments or polymeric layer to render the surface properties of gloss and moisture resistance. The polymeric layers typically comprise thermosetting polymers but they can also be in the form of thermoplastic films giving the surface a desired texture or ornamentation.

Particle boards are, however, prone to swell under the influence of moisture and water, and have poor bending strength. Therefore, in many applications where improved properties of mechanical strength and dimensional stability are sought, particle boards are replaced with multi-ply wood panels typically composed of boards formed by overlapping layers of wood veneer which are interlayered with layers of adhesives (cements), which bond the veneer layers together and give a structure which high compression and bending strength.

Veneer layers are produced from logs by the action of peeling or cutting. As a result, typically, the surface of the veneer may have minor defects stemming from the raw-material (e.g. knots) which are of no or only minor importance for the mechanical strength and cannot even be observed in the intermediate layers of the panel. However, such defects or unevenness in the top layers of the multi-ply panels can be seen through any coating which is applied on the panel, unless the surface is levelled off with the aid of levelling material. This is impractical and expensive.

There is therefore a need for a novel kind of multi-ply board which combines the mechanical strength properties of multi-ply boards with properties of high smoothness to give a core board suitable for production of coated structural or decorative panels.

SUMMARY OF INVENTION

It is an aim of the present invention to eliminate at least a part of the problems relating to the art and to provide a novel method of producing a core board suitable for a coated multi-ply wood panel.

It is another aim of the invention to provide novel coated multi-ply wood panel.

The present invention is based on the concept of providing, for a core board, a wood based material in the form of a plurality of layers and an adhesive suitable for bonding said layers to each other. The wood based layers and the adhesive are organized in alternating order to form a stack which has two opposite faces formed by a wood based layer. On at least one of said faces further adhesive and a layer of fibrillated fibers are arranged to form a modified stack, which is then finally pressed in a one-step pressing process into a multi-ply wood panel suitable for coating, which has a facing coated with a layer of fibrillated fibers and exhibiting a predetermined strength.

A coated multi-ply wood panel of the present kind comprises a core board of overlapping layers of wood based material bonded together and having a facing consisting of a layer of fibrillated fibers bonded to one or both faces thereof. At least one of said facings has a coating layer on top of the layer of fibrillated fibers.

The present invention provides considerable advantages. The surface of the core board is already after production smooth and free from defects and unevenness. The smoothness can be readily further improved by sanding or other mechanical leveling treatments.

The present core board is not prone to swelling under the influence of moisture. By providing the core board with fibrous layers on both sides, the dimension stability (rigidity) of the board can be ensured.

The surface of the present core board is particularly suitable as a substrate for coatings, such as layers of thermosets optionally mixed with fillers and pigments, and other surface coatings, including plastic films, in particular laminates. Thus, a coated core board of the present kind is suitable for use in furniture, such as cupboards, doors and blanks thereof, and interior decoration panels. In particular, the core board is particularly suitable for coatings and surface layers having high gloss, which need an even substrate.

The core board is readily produced by pressing the fibrous layer(s) in the same hot press as the structural layers of the board, whereby superfluous processing steps are avoided.

In the present invention, a ready-made sheet of a fiber board, such as MDF or HDF, is applied on top of a core board, such as plywood, and joined with the underlying surface.

Further features and advantages of the present technology will appear from the following description of embodiments.

BRIEF DESCRIPTION OF DRAWING

FIG. 1 shows in a schematic fashion the structure of a multi-ply board according to one embodiment of the invention.

EMBODIMENTS

In the present context, the term "core board" stands for a board which is capable of being provided with a surface layer. The board is a multi-ply board.

"Multi-ply board" stands for boards which comprise a plurality of layers of overlapping sheet-like material. There are at least 2, preferably at least 3 layers, of such material. There can be up to about 250 overlapping layers, although in practice the maximum number is typically 100. The sheet-like material can be continuous or it can consist of several sheets orientated in the same plane; conventionally at least a majority of the layers of sheet-like material is formed by wood veneer or wood strands.

The term "wood based layer" covers, e.g., wood veneer and wood strand.

In one embodiment, the multiply board comprises or consists or consists essentially of a plurality of layers of wood veneer.

There can, however, be a number of layers formed by material capable of conferring preselected mechanical or chemical properties in the board, as well. Such materials are exemplified by metal foils, such as aluminium foils and films, textile layers, for example non-woven sheets, polymeric films and sheet, such as polyolefin, polyamide and EVOH films for barrier purposes, and polyamide and polyaramid films and fabrics for structural purposes.

Typically, in the present multi-ply boards, the majority of the layers are of wood material.

The sheet-like materials are typically bonded together using intervening layers of adhesive (or "cement").

The term "board" is used interchangeably with "panel" and stands for a piece of material which has at least one planar surface. Preferably the "board" has two opposite planar surfaces which are generally orientated in parallel.

Typically, in the present context, the core board is an elongated planar structure. It has dimensions in the range from 10 . . . 15000 mm times 10 . . . 20000 mm. In particular the present board has a width of 50 . . . 2500 mm and a length of 300 . . . 10000 mm. The thickness of the "core board" is generally between 3 and 250 mm, in particular 4 to 120 mm.

The "surface layer" is a layer on one or both opposite facings of the core board. The surface layer forms the substrate upon which is final coating can be applied.

In the present context, "one step pressing" stands for a pressing procedure wherein a stack, which is formed by overlapping layers of structural material and adhesive, is pressed by a pressing operation, typically carried out at one pressing station, until a predetermined compression strength of the board is obtained. The pressing can be carried out applying continuously increased compression or by applying compression at successive stages of different pressures. As will be explained below in more detail, in embodiments of the present technology, there can be a succession of at least one stage with a first pressure and a second stage of a second pressure, the first pressure being lower than the second pressure.

"Stack" stands for an organized pile of overlapping layers.

"Modified stack" stands for a stack which has a number of overlapping layers formed by wood based materials optionally together with non-wood materials, and which exhibits at least one surface formed by a layer of fibrillated fibers.

"Fibrillated fibers", as commonly known in the art, stand for fibers obtained for example by a defibrator (also known as a refiner, such as a thermos mechanical pulping refiner) in which the starting material, such as wood, for example in the form of chips, is ground to form a fiber material. Typically, in a defibrator or refiner, the chips are ground, preferably in the presence of steam, between discs, in particular discs having a grooved surface. For example, grinding is carried out between rotating grinding discs or one rotating grinding disc and a stationary disc, at least one, preferably each disc, being provided with grooves that provide the grinding surface.

According to embodiments of the present technology, methods are provided for producing core boards suitable for coated multi-ply wood panels. Further, in the present technology, coated multi-ply wood panels are also provided.

One embodiment comprises in a combination the steps of
providing a wood based material in the form of a plurality of layers of such material and an adhesive suitable for bonding said layers to each other; and
arranging the layers of the wood based material into a stack with layers adhesive on between the wood based material layers.

The wood based material used for forming the core board is obtained by peeling or cutting of a suitable wood raw-material.

Typically, the wood layers or strands are produced from softwood or hardwood, such as spruce, pine, larch, birch, poplar, aspen, alder, eucalyptus or mixed tropical hardwood.

The thickness of the wood based layers is generally from about 0.5 to 5 mm, in particular about 0.9 to 3.5 mm.

In one embodiment, the wood based layers consist of wood veneer. The core board is typically a multi-ply veneer panel or laminated veneer lumber.

In another embodiment, there are one or several layers of a non-wood material in the stack. Such layers will provide improve mechanical, chemical, biological and acoustic properties to the final product. The thickness of such non-wood layers is about 0.01 to 5 mm. For metal foils, the thickness is typically 0.01 to 0.5 mm, for polymeric layers typically 0.1 to 3 mm, for cork layers about 0.5 to 5 mm.

In one embodiment, the stack formed will have two opposite faces formed by a wood based layer. However, in an alternative embodiment, either or both of the top layers are formed by a non-wood material, for example a layer of the kind discussed above.

The wood based layers and optionally non-wood layers are bonded together with an adhesive. The adhesive can be an adhesive resin. The adhesive resin can be provided in the form or a dry powder, for example as a hot melt adhesive, or as a liquid or as a combination thereof. The adhesive can be applied so as to form adhesive layers which uniformly cover at least a part, in particular all or essentially all, of the adjacent surfaces. The adhesive can also or alternatively be applied in the form of discontinuous spots or stripes.

The adhesive is in particular a thermosetting polymer. Such polymers can be selected from the groups of phenol-formaldehyde adhesives, melamine-formaldehyde adhesives, urea-formaldehyde adhesives, polyurethane adhesives and lignin based resins and combinations thereof. The adhesive can be applied on the layers of wood based material and non-wood material in manners known per se, for example by coating or spraying. In one embodiment, the adhesive is applied in the form of fibrous sheets which are impregnated with adhesive.

FIG. 1 shows in a schematic fashion the structure of a 5-ply board, with five overlapping layers of wood veneer, with the grain direction being either longitudinal (−) or transversal (/).

On at least one of the faces of the stack, preferably on both, adhesive and fibrillated fibers are applied to modify the surface of the stack formed by the wood based material (with intervening adhesive layers and any non-wood layers) with top layers of fibrillated fibers.

This is indicated in FIG. 1 with the abbreviation "HDF".

The adhesive for bonding the layer of fibrillated fibers to the adjacent multi-ply structure can be applied as a separate layer on top of which a layer of fibrillated fibers is applied. Instead of separates layers of adhesive and fibrillated fibers, it is also possible to apply a mixture of fibrillated fibers and adhesive resin on the face(s) of the stack.

The modified stack thus obtained will then be pressed, as will be disclosed in more detail below, to form a multi-ply wood panel with at least one, preferably both facings coated with a layer of fibrillated fibers.

In an embodiment, the fibrillated fibers are provided in the form of a self-supporting fibrous sheet. Such a sheet is preferably formed by compacting or pressing a supply of fibrillated fibers mixed with an adhesive into a compacted sheet. Generally, it is preferred that the fibrous sheet has properties of integrity. Self-bearing fibrous sheet will allow for ease of handling; to that end the self-supporting sheet will preferably have a stiffness sufficient for allowing mechanical handling in a process of the present kind for forming a stack of layers.

The fibrillated fibers are selected from the group of cellulosic fibers and lignocellulosic fibers and combinations thereof. Such fibers are preferably provided in the form of a fibrous sheet selected from the group of medium density fiberboards (commonly abbreviated "MDF") and high density fiberboards (commonly abbreviated "HDF").

The layer of fibrillated fibers (produced from loose fibers or as an integral sheet) has, in one embodiment, a thickness of 1 to 10 mm, in particular about 1.2 to 5 mm. The structure shown in FIG. 1 has surface layers formed by HDF board having a thickness of 1.5 mm.

The "fibrillated" fibers are typically produced by mechanical processing of wood raw-material, such as logs or chips, in particular logs or parts thereof. In one embodiment, the mechanical processing comprises the steps of cutting or shearing of the wood to release fibrillated fibers from the wood raw-material. Thus, the fibers can be produced by refining or grinding of logs or chips. In one embodiment, the fibers are obtained by thermomechanical refining. Other methods of producing mechanical pulp can be employed as well.

The fibrillated fibers can be obtained from any wood species. Typically, they are produced from softwood or hardwood, such as spruce, pine, larch, birch, polar, aspen, alder, eucalyptus or mixed tropical hardwood.

The fibrillated fibers—either as loose fibers or in the form of a sheet—are bonded to the facing layer of the adjacent layer of the wood based layer with an adhesive resin. In one embodiment, the adhesive resin is selected from the group thermosetting polymers. Such polymers can be selected from the groups of phenol-formaldehyde adhesives, melamine-formaldehyde adhesives, urea-formaldehyde adhesives, polyurethane adhesives and lignin based resins and combinations thereof.

The adhesive resin for the fibrillated fibers can be provided in the form or a dry powder, for example as a hot melt adhesive, or as a liquid or as a combination thereof.

The adhesive resin can be applied upon the face(s) of the stack by conventional coating methods, for example by spraying or by curtain coating. As mentioned above, in one embodiment, the adhesive is applied on the face(s) of the stack mixed with the fibrillated fibers.

In one embodiment, the adhesive is provided in the form of fibrous sheets impregnated with said adhesive. The use of such impregnated sheets allows for ease of handling and will also stand for an even and spread of the adhesive material over the entire surfaces of facing layers of wood material.

In one embodiment, a stack formed by stacking alternating layers of wood based material and adhesive is not pressed at all or it is pressed to a compression strength amounting to less than 50% of predetermined compression strength of the core board, before the application of surface layer(s) of fibrillated fibers. Therefore, the pressing, or pressing to final compression strength is only carried out after the application of a layer of fibrillated fibers on at least one of the surface.

The stack is preferably formed at least essentially by vertical stacking, although it is possible to stack layers horizontally as well.

When stacking is performed vertically, it is preferred first to provide a layer of fibrillated fibers together with adhesive, upon which the wood layers and/or layers of other material are stacked. After the completion of the stacking, a final top layer of fibrillated fibers with adhesive is then provided.

One embodiment suitable for vertical stacking comprises forming a layered structure by
 providing a first fibrous layer consisting of a sheet of fibrillated fibers;
 providing on top of the first fibrous layer a first adhesive layer consisting of an adhesive suitable for bonding said first fibrous sheet to a sheet of a wood based material;
 providing on the opposite side of the second layer a plurality of sheets of wood based material, interlayered with layers of adhesive to form a stack;
 providing on the opposite side of the stack, in respect to the first adhesive layer, a second adhesive layer; and
 providing on top of the second adhesive layer a second fibrous layer consisting of a sheet of fibrillated fibers; and
 pressing the layered structure thus obtained to form a core board suitable for a coated multi-ply wood panel.

The modified stack is pressed into a compressed board to form a core board suitable for coating. The pressing can be carried out in one or a plurality of stages, typically there are 1 to 10 pressing stages, for example 1, 2 or 3 stages. Pressing can be carried out at room temperature (15 to 30° C.) or at an increased temperature (higher that 30° C.). Typically, the stack is pressed into a core board having a predetermined compression strength by subjecting the modified stack to one-step compressing.

The steps of forming a layered structure and of pressing the layered structure are carried out in a hot press.

In one embodiment, the modified stack is pressed to formed the multi-ply wood panel at a temperature of 80 to 170° C. and a pressured of about 1 to about 10 MPa.

In another embodiment, the modified stack is pressed in a first stage at a temperature of 10 to 40° C. and a pressure of 0.1 to 1 MPa, and in a second stage at a temperature of about 100 to about 160° C. at a pressure of about 1 to about 3 MPa The material obtained by the present technology is suitable for coating. The even and smooth surface of the core panel makes it particular suitable for coating with, e.g., glossy films and coatings. If necessary, the surface layers of fibrillated fibers can be levelled or sanded to increase smoothness before coating.

Thus, embodiments of the present technology comprise coated multi-ply wood panel comprising
 a core board of overlapping layers of wood based material bonded together and having a facing consisting of a layer of fibrillated fibers bonded to one or both faces thereof, and
 at least one of said facing having a coating layer on top of the layer of fibrillated fibers.

A panel of this kind can have a coating layer covering at least 75%, preferably at least 90%, of the surface of the layer of fibrillated fibers. There can be coating layers on one or both facings of the core board.

The coating can be a polymeric layer, in particular the coating can be a polymeric layer capable of rendering the panel a glossy surface.

Suitable polymeric layers are formed by thermoplastic films and thermoplastic laminates of two or more layers.

Suitable polymeric layers are also formed by polymeric layers comprising hardened thermoset polymers. Such polymer layers, which typically comprise polymers used as binder, further contain pigments having hiding powers, such as titanium dioxide, and/or being able to confer properties of gloss to the polymer layer. Examples of pigments capable of conferring properties of gloss include polymeric pigments, e.g. have essentially spherical sizes.

In one embodiment, the coating layer has a decorative surface on the opposite side to the panel.

The facing of the core board is smooth and abuts with the coating layer. The facing comprises high density fibers or medium density fibers of combinations thereof.

One embodiment relates to a method of producing a core board suitable for a coated multi-ply wood panel, comprising the steps of
- providing a wood based material in the form of a plurality of layers of wood veneer;
- providing an adhesive suitable for bonding said layers to each other;
- arranging the layers of the wood based material and the adhesive in alternating order to form a stack, the stack having two opposite faces formed by a wood based layer;
- providing on at least one of the faces a layer of fibrillated fibres in the form of a fibrous sheet selected from the group of medium density fiber boards and high density fiber boards to form a modified stack; and
- pressing the modified stack to form a multi-ply wood panel having a facing coated with a layer of fibrillated fibres.

In one embodiment, a compressed panel is provided which comprises or consists of consists essentially of a coated multi-ply wood panel, comprising a core board for overlapping layers of wood veneer bonded together with an adhesive and having a facing consisting of a layer of fibrillated fibres selected from the group of medium density fiber boards and high density fiber boards bonded to one or both faces thereof, and at least one of the facings having a coating layer on top of the layer of fibrillated fibres.

INDUSTRIAL APPLICABILITY

The present coated multi-ply wood panels find uses in the furniture industry where they can be used as parts and blanks in the manufacture of cupboards, doors and interior decoration panels, in flooring, in walls and in ceilings. For example, in one particularly interesting application, the present core boards are used for doors and as door blanks, incorporating functional layers for achieving acoustic properties (sound-proofing with cork layers) as well as fire insulation with layers of metal foils optionally in combination with flame-retarding agents. In the case of functional doors, a fire-retardancy of 30 to 60 min is typically aimed at. Multi-ply hardwood panels can be combined with such layers to give boards of thicknesses in the range of about 40 to 75 mm and further provided with surfacing of fibrillated fibers, which can be coated with a laminate or by painting to achieve a decorative surface.

The invention claimed is:

1. A method of producing a multi-ply wood panel, comprising the steps of:
   providing a plurality of wood-based layers;
   providing an adhesive for bonding said wood-based layers to each other;
   arranging the wood-based layers and the adhesive in alternating order to form a stack, said stack having two opposite faces;
   applying a self-supporting sheet of fibrillated fibers on at least one of the two opposite faces of the stack along with further adhesive for bonding the self-supporting sheet to the at least one opposite face to form a modified stack; and
   pressing the modified stack to form the multi-ply wood panel having the at least one opposite face having the self-supporting sheet of fibrillated fibers applied thereon,
   wherein the stack, formed by the alternating layers of the wood-based layers and the adhesive for bonding the wood-based layers to each other, is not pressed at all prior to the applying of the self-supporting sheet and pressing the modified stack.

2. The method according to claim 1, further comprising bonding a self-supporting sheet to both of the two opposite faces of the stack, wherein one of the self-supporting sheets, on both of the two opposite faces of the stack, is the self-supporting sheet of fibrillated fibers.

3. The method according to claim 1, wherein the fibrillated fibers are selected from the group consisting of cellulosic fibers, lignocellulosic fibers, and combinations thereof.

4. The method according to claim 1, wherein the self-supporting sheet is selected from the group consisting of medium density fiberboards and high density fiberboards.

5. The method according to claim 1, wherein the self-supporting sheet has a thickness of 1 to 10 mm.

6. The method according to claim 1, wherein the further adhesive is selected from the group consisting of phenol-formaldehyde adhesives, melamine-formaldehyde adhesives, urea-formaldehyde adhesives, polyurethane adhesives, lignin-containing resins, and combinations thereof.

7. The method according to claim 1, wherein the self-supporting sheet is impregnated with said further adhesive.

8. The method according to claim 1, wherein the modified stack is pressed to a predetermined compression strength by subjecting the modified stack to one-step compressing.

9. The method according to claim 1, further comprising the steps of:
   forming a layered structure by:
      providing the self-supporting sheet of fibrillated fibers;
      providing on top of the self-supporting sheet of fibrillated fibers a first layer of the further adhesive and bonding said self-supporting sheet to a first wood-based layer of the plurality of wood-based layers;
      providing on the opposite side of the first wood-based layer in contact with the self-supporting sheet, a plurality of further wood-based layers of the plurality of wood-based layers, interlayered with layers of the adhesive for bonding the wood-based layers to each other forming the stack;
      providing on the opposite face of the stack, with respect to the first layer of the further adhesive, a second layer of the further adhesive; and
      providing on top of the second layer of the further adhesive a second self-supporting sheet of the fibrillated fibers to form the layered structure; and
   pressing the layered structure thus obtained to form the multi-ply wood panel.

10. The method according to claim 9, wherein the forming the layered structure and the pressing of the layered structure are carried out in a hot press.

11. The method according to claim 1, wherein the modified stack is pressed to form the multi-ply wood panel at a temperature of 80 to 170° C. and a pressure of about 1 to about 10 MPa.

12. The method according to claim 1, wherein the pressing of the modified stack comprises pressing in a first stage at a temperature of 10 to 40° C. and a pressure of 0.1 to 1 MPa, and in a second stage at a temperature of about 100 to about 160° C. at a pressure of about 1 to about 3 MPa.

13. The method according to claim 1, wherein the wood-based material is selected from the group consisting of wood veneer, wood strands, and combinations thereof.

14. The method according to claim 1, further comprising coating the multi-ply wood panel with a polymeric layer that provides the multi-ply wood panel with a glossy surface.

15. The method according to claim 14, wherein the polymeric layer comprises a member selected from the group consisting of a laminate of two or more thermoplastic layers, a thermoplastic film, and a hardened thermoset polymer.

16. The method according to claim 14, wherein the polymeric layer comprises one or more pigments capable of conferring properties of gloss to the polymeric layer.

17. The method according to claim 1, wherein the further adhesive comprises a phenol-formaldehyde adhesive.

18. The method according to claim 1, wherein the pressing of the modified stack forms the multi-ply wood panel at a temperature of at least 30° C.

* * * * *